United States Patent
Sugeno et al.

(10) Patent No.: US 7,593,588 B2
(45) Date of Patent: Sep. 22, 2009

(54) EDGE PRESERVATION TYPE IMAGE PROCESSING DEVICE

(75) Inventors: Shuji Sugeno, Moriya (JP); Shigeyuki Ikeda, Kashiwa (JP); Tadashi Nakamura, Kashiwa (JP)

(73) Assignee: Hitachi Medical Corporation, Tokyo (JP)

( * ) Notice: Subject to any disclaimer, the term of this patent is extended or adjusted under 35 U.S.C. 154(b) by 585 days.

(21) Appl. No.: 10/522,027

(22) PCT Filed: Jul. 23, 2003

(86) PCT No.: PCT/JP03/09326

§ 371 (c)(1),
(2), (4) Date: Jan. 21, 2005

(87) PCT Pub. No.: WO2004/010379

PCT Pub. Date: Jan. 29, 2004

(65) Prior Publication Data

US 2006/0098892 A1 May 11, 2006

(30) Foreign Application Priority Data

Jul. 23, 2002 (JP) .............................. 2002-213297

(51) Int. Cl.
*G06K 9/00* (2006.01)
*G06K 9/40* (2006.01)
(52) U.S. Cl. ....................... 382/266; 382/265; 382/263; 382/260; 382/128
(58) Field of Classification Search ........................ None
See application file for complete search history.

(56) References Cited

U.S. PATENT DOCUMENTS 5,757,362 A * 5/1998 Levine ....................... 345/166

(Continued)

FOREIGN PATENT DOCUMENTS

JP 9-182093 7/1997

(Continued)

OTHER PUBLICATIONS

IEEE International Symp. On Circuit and Systems, Jun. 7-9, 1988, pp. 2561-2564, vol. 3.

*Primary Examiner*—Andrew W Johns
*Assistant Examiner*—Mia M Thomas
(74) *Attorney, Agent, or Firm*—Antonelli, Terry, Stout & Kraus, LLP.

(57) ABSTRACT

An edge preservation type of recursive filter 12 outputs an unsharpened image (i.e., low-frequency components) which is smoothed while preserving an edge of an input image in at least one direction (e.g., a vertical direction of the image). The low-frequency components are compressed into a suitable amount by a LUT 14 provided as low-frequency component compression amount setting means and then output. An arithmetic unit 18 provided as low-frequency component compression means compresses the low-frequency components of the input image by subtracting from the input image the output value from the LUT 14. The edge-preservation-type recursive filter 12 can extract the low-frequency components of the input image with an input time delay corresponding to one line of the input image. Therefore, DRC processing has only a short delay due to image processing and is capable of real-time processing by a small amount of computation. In this way, contrast at a medium-to-fine detail of the image such as a catheter can be improved while preventing occurrence of an artifact such as a black region in the processed image.

9 Claims, 5 Drawing Sheets

U.S. PATENT DOCUMENTS

| | | | |
|---|---|---|---|
| 5,768,405 A * | 6/1998 | Makram-Ebeid | 382/128 |
| 5,911,012 A * | 6/1999 | Bernard et al. | 382/260 |
| 6,151,417 A * | 11/2000 | Florent | 382/265 |
| 6,445,830 B1 * | 9/2002 | Gilling | 382/254 |
| 6,466,700 B1 * | 10/2002 | Makram-Ebeid | 382/265 |
| 6,511,426 B1 * | 1/2003 | Hossack et al. | 600/437 |
| 6,724,943 B2 * | 4/2004 | Tsuchiya et al. | 382/261 |
| 6,823,090 B2 * | 11/2004 | Matsuura | 382/275 |
| 6,965,416 B2 * | 11/2005 | Tsuchiya et al. | 348/606 |
| 6,999,634 B2 * | 2/2006 | Hong | 382/275 |
| 7,095,902 B2 * | 8/2006 | Izume et al. | 382/266 |
| 7,127,122 B2 * | 10/2006 | Ogata et al. | 382/260 |
| 7,170,635 B2 * | 1/2007 | Ishiguro | 358/1.9 |
| 7,177,481 B2 * | 2/2007 | Kaji | 382/265 |
| 7,265,785 B2 * | 9/2007 | Hamasaki | 349/242 |
| 2001/0038716 A1 * | 11/2001 | Tsuchiya et al. | 382/261 |
| 2002/0035407 A1 * | 3/2002 | Ishito et al. | 700/94 |
| 2002/0047911 A1 * | 4/2002 | Tsuchiya et al. | 348/252 |
| 2002/0094114 A1 * | 7/2002 | Ogino | 382/128 |
| 2002/0159649 A1 * | 10/2002 | Mollov et al. | 382/261 |
| 2002/0181797 A1 * | 12/2002 | Young | 382/260 |
| 2003/0169239 A1 * | 9/2003 | Nakano et al. | 345/173 |
| 2003/0227558 A1 * | 12/2003 | Jaspers | 348/241 |
| 2004/0252907 A1 * | 12/2004 | Ito | 382/260 |
| 2004/0264752 A1 * | 12/2004 | Cline et al. | 382/128 |

FOREIGN PATENT DOCUMENTS

| | | |
|---|---|---|
| JP | 10-49669 | 2/1998 |
| JP | 1153535 | 2/1999 |
| WO | WO 2004/010379 A1 | 1/2004 |

* cited by examiner

EDGE PRESERVATION TYPE IMAGE PROCESSING DEVICE

TECHNICAL FIELD

The present invention relates to an image processing device and, more particularly, to an image processing device which enhances contrast for medium-to-fine details (a catheter, blood vessels, etc.) of an image by compressing low-frequency components of the image collected by a measurement section of an image diagnosis apparatus or the like.

BACKGROUND ART

On medical images obtained by conventional X-ray image diagnosis apparatuses or the like, dynamic range compression processing (DRC processing) is performed to enhance contrast at a guide wire, a catheter, a blood vessel, etc. DRC processing is processing for compressing low-frequency components of an input image.

For extraction of low-frequency components in DRC processing, a method (Japanese Patent Application Laid-open No. 9-182093) which uses an infinite impulse response (IIR) filter (also called a recursive filter) is known.

The recursive filter is a feedback-type filter which performs present smoothing processing by using the results of preceding smoothing processing, and which is capable of efficiently extracting low-frequency components by a smaller amount of computation in comparison with FIR filters.

A top-bottom/left-right recursive filter performs recursive filtering processing by reciprocating along top-bottom and left-right directions with respect to the direction of scanning on an input image, i.e., four cycles of recursive filtering processing in total, to obtain an unsharpened image free from phase distortion (Japanese Patent Application Laid-open No. 9-182093).

The conventional recursive filter performing recursive filtering on an input image by reciprocating along top-bottom and left-right directions, i.e., four cycles of recursive filtering processing in total, requires at least a time for input of one frame of image data in obtaining an output value for a particular one of pixels. Thus, DRC processing using a top-bottom/left-right recursive filter is not suitable for real-time processing because of a large delay due to image processing.

An object of the present invention is to provide an image processing device having only a short delay due to image processing and a small amount of computation, free from an artifact such as black region in a processed image, and capable of largely improving contrast for a medium-to-fine detail of an image such as a catheter.

DISCLOSURE OF THE INVENTION

To achieve the above-described object, the present invention provides an image processing device comprising recursive filtering means of smoothing an input image and arithmetic means of subtracting an input image smoothed by the recursive filtering means from the original of the input image, wherein the recursive filtering means includes edge setting means of setting at least one edge having a predetermined angle from a scanning line direction of the input image, and control means of smoothing the image to be smoothed in correspondence with the edge set by the edge setting means.

That is, the control means controls the recursive filter so that the recursive filter outputs a smoothed image (unsharpened image, i.e., low-frequency components) smoothed in an edge direction set as the direction of an edge of the input image (e.g., a direction perpendicular to the line of scanning on the image). The low-frequency components are compressed into a suitable amount by low-frequency component compression amount setting means and thereafter output. Low-frequency component compression means compresses the low-frequency components of the input image by subtracting from the input image the output value from the low-frequency component compression amount setting means. The recursive filter can extract the low-frequency components of the input image with an input time delay corresponding to one line of the input image. Therefore, DRC processing has only a short delay due to image processing and is capable of real-time processing by a small amount of computation.

Also, in the recursive filter, the feedback rate is changed according to the magnitude of the value of the difference between the input image and the output image one-line before. For example, if the absolute value of the difference value is smaller, the degree of smoothing is increased. If the absolute value of the difference value is larger, the degree of smoothing is reduced. In this way, the influence of phase distortion (an artifact such as a black region due to DRC processing on a falling low-luminance portion of the input image in particular) is prevented and contrast at a medium-to-fine detail of the image such as a catheter is improved.

Phase distortion can be further reduced by providing a plurality of recursive filters which output unsharpened images smoothed on the basis of edges in a plurality of directions, and by combining outputs from the recursive filters.

BEST MODE FOR CARRYING OUT THE INVENTION

Preferred embodiments of the present invention will be described in detail with reference to the accompanying drawings.

Figure 1:
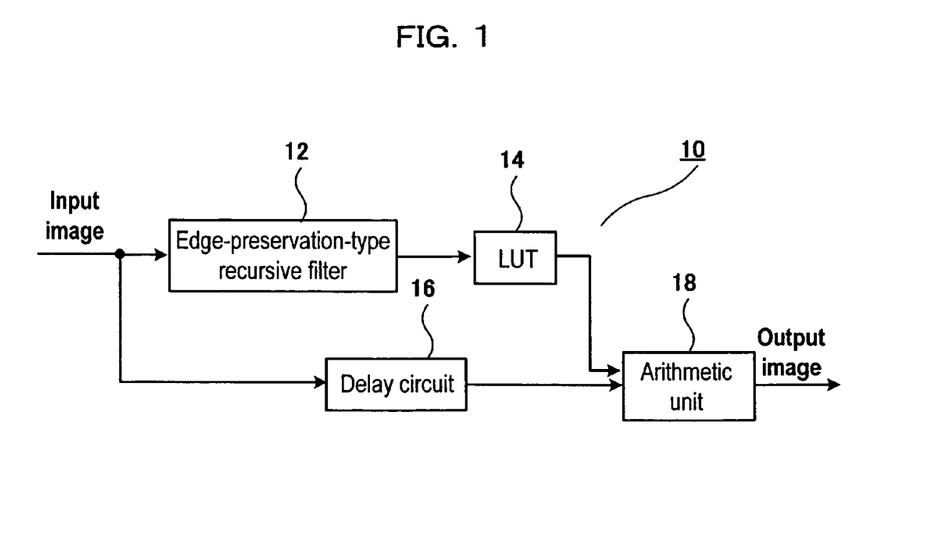
FIG. 1 is an essential-portion block diagram showing an embodiment of an image processing device in accordance with the present invention.

FIG. 1 is an essential-portion block diagram showing an embodiment of an image processing device in accordance with the present invention.

As shown in FIG. 1, an image processing device 10 is constituted by an edge preservation type of recursive filter 12, a lookup table (LUT) 14, a delay circuit 16, and an arithmetic unit 18. "Edge" referred to herein denotes a portion of an image at which the difference between the values of adjacent pixels in data on one line of the image is large.

An input image in the image processing device 10 is, in the case of a medical image diagnosis apparatus such as an X-ray imaging apparatus for example, a digital image measured in an X-ray image measurement section including an image intensifier and a CCD camera or an X-ray flat panel detector or the like. For example, the digital image is a fluoroscopic image continuously collected as a moving image of 1024× 1024 pixels, 4096-step gradation, and 30 frames/second. The digital image may alternatively be an image collected in real time by an ultrasonic diagnosis apparatus.

The above-described input image is input to the edge-preservation-type recursive filter 12 and the delay circuit 16 of the image processing device 10.

The edge-preservation-type recursive filter 12 will next be described. The edge-preservation-type recursive filter 12 represents recursive filtering processing performed in a direction in which its edge is set or preserved.

Figure 2:
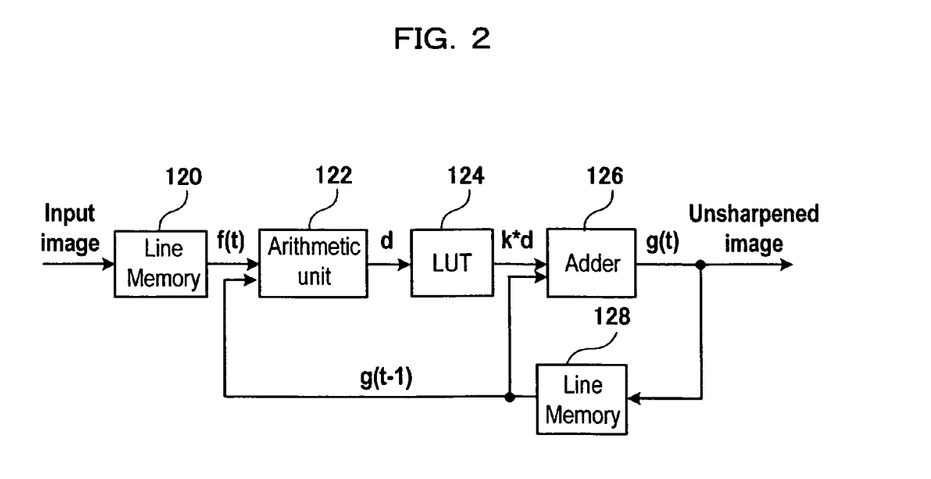
FIG. 2 is a block diagram showing an example of a configuration of the recursive filter shown in FIG. 1.

FIG. 2 is a block diagram showing an example of a configuration of the above-described edge-preservation-type recursive filter 12. The edge-preservation-type recursive filter 12 is constituted by line memories 120 and 128, an arithmetic unit 122, a LUT (LookUp Table) 124 and an adder 126.

Before input of frame-by-frame input images, a value 0 is set in all addresses in the line memory 128. Subsequently, line data on the first line (uppermost portion) of an input image is stored in the line memory 120. The arithmetic device 122 subtracts, from image data f(t) stored in the line memory 120, image data g(t−1) stored in the line memory 128 at the corresponding address one-line before, thereby obtains a difference value d and outputs the difference value d to the LUT 124.

In the LUT 124, values (k×d) obtained by multiplying all difference values d (e.g., d=−4095, . . . , 4095) by a filter coefficient k dependent on the input value in the edge-preservation-type recursive filter 12 are stored in advance. The LUT 124 reads out the table value (k×d) corresponding to the input difference value d and outputs the table value to the adder 126. Another input to the adder 126 is image data g(t−1) output from the line memory 128. The adder 126 adds together these two inputs and outputs the sum value as image data g(t) representing an unsharpened image. This image data g(t) is also stored in the line memory 128 and is output from the line memory 128 as one-line delayed image data g(t−1).

The function of the above-described edge-preservation-type recursive filter 12 is expressed by the following equation:

$$g(t) = k \cdot d + g(t-1) \quad (1)$$
$$= k\{f(t) - g(t-1)\} + g(t-1)$$
$$= k \cdot f(t) + (1-k) \cdot g(t-1)$$

In the above equation (1), (1−k) represents a feedback rate. If the feedback rate is higher (k is closer to 0), the degree of smoothing is increased. If the feedback rate is lower (k is closer to 1), the degree of smoothing is decreased. When k=1, the edge-preservation-type recursive filter 12 immediately outputs the input value without performing smoothing.

Figure 3:
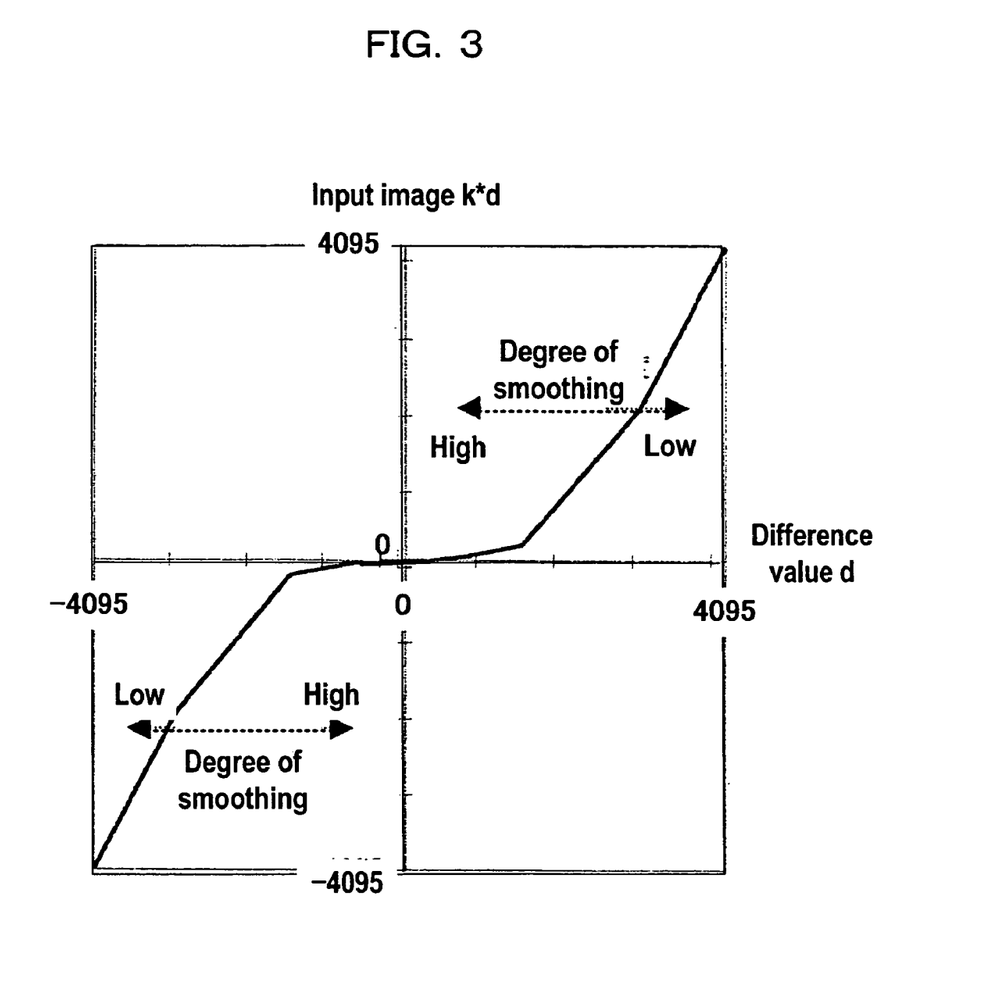
FIG. 3 is a graph showing input-output characteristic of the LUT shown in FIG. 1.

FIG. 3 shows an example of the LUT 124. When the difference value d is small (in the case of a non-edge portion), the gradient from the origin (=filter coefficient) k is set to a small value (e.g., k=1/64). When the difference value d is large (in the case of an edge), the gradient k is set to a large value (e.g., k=1).

The output from the above-described edge-preservation-type recursive filter 12 is input to the LUT 14 shown in FIG. 1. In the LUT 14, a low-frequency component compression characteristic according to low-frequency components of the input image can be set. The LUT 14 may have, for example, an input-output characteristic of y=αx (x: input; y: output; low-frequency component compression rate α=0.2). By various setting means comprising input means such as a mouse and keyboard known as input means for computer systems, the input image on a display unit and a compression characteristic input menu are displayed on a display unit to enable input of a region of interest and various values such as numeric values.

As low-frequency component compression amount setting means, a bit-shift arithmetic device for example may be used as well as the above-described LUT 14. The extent of bit shift in such a case may be set to about two bits (α=¼).

The output from the LUT 14 is input to the arithmetic unit 18. Another input to the arithmetic unit 18 is the input image supplied via the delay circuit 16. The delay circuit 16 is a circuit for coincidence with respect to time between a particular one of the pixels of the input image and the corresponding one of the pixels of the unsharpened image. The delay circuit 16 delays the input image by the length of time corresponding to the delay caused by the line memory 120 and so on of the edge-preservation-type recursive filter 12.

The arithmetic unit 18 subtracts the output image (unsharpened image) of the LUT 14 from the input image and outputs an image in which the low-frequency components of the input image are compressed. The output image output from the arithmetic unit 18 in the form of a digital signal is converted into an analog signal by a D/A converter not shown in the figures, and the resulting image is displayed on a monitor such as a CRT or a liquid crystal monitor.

As a result of the above-described dynamic range compression processing, if the input image has, for example, 4096 levels of gray, the output image has about 3277 levels of gray (=4095 (1−0.2)+1). Thus, low-frequency components are largely compressed in a pulmonary region in an X-ray fluoroscopic image where halation can easily occur. Consequently, halation is reduced and contrast for travel of a catheter, blood vessels, etc. is improved.

Figure 4:
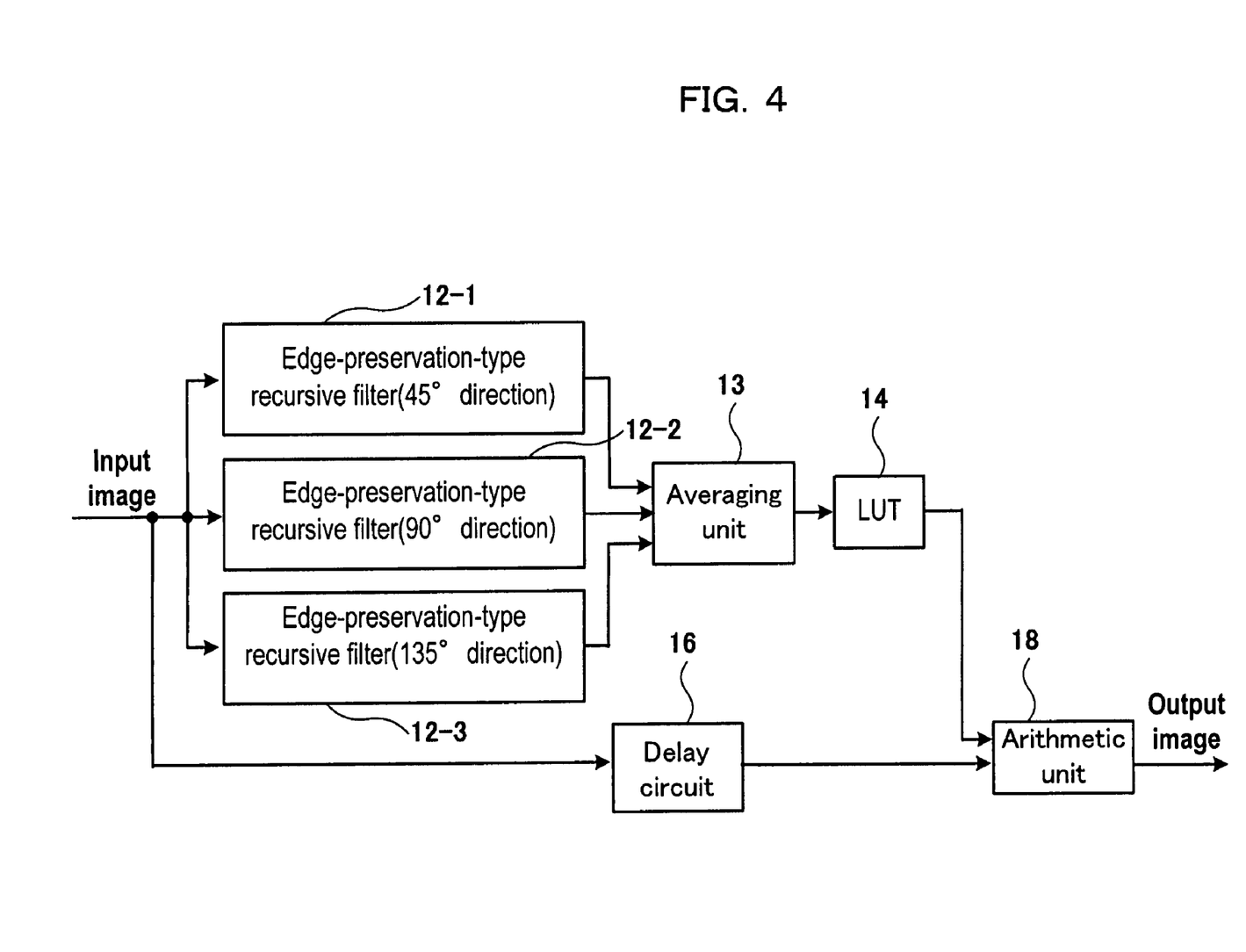
FIG. 4 is an essential-portion block diagram showing another embodiment of the image processing device in accordance with the present invention.

FIG. 4 is an essential-portion block diagram showing another embodiment of the image processing device in accordance with the present invention. Portions in this embodiment identical to those in the image processing device 10 shown in FIG. 1 are indicated by the same reference characters and detailed description for them will be omitted.

The image processing device 100 shown in FIG. 4 is constituted by three edge-preservation-type recursive filters 12-1, 12-2, and 12-3, an averaging unit 13, a LUT 14, a delay circuit 16 and an arithmetic unit 18.

Figure 5:
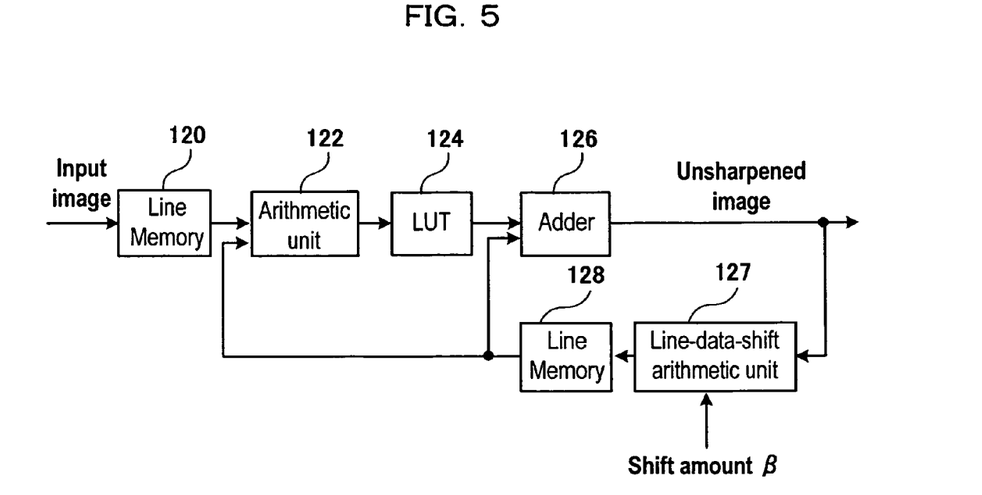
FIG. 5 is a block diagram showing an example of a configuration of the recursive filter shown in FIG. 4.

Three edge-preservation-type recursive filters 12-1, 12-2, and 12-3 output smoothed unsharpened images while respectively preserving edges in a 45° direction (left-downward direction), a 90° direction (downward direction) and a 135° direction (right-downward direction) with respect to the input image. FIG. 5 shows an example of a configuration of the edge-preservation-type recursive filters 12-1, 12-2, and 12-3.

The example of the configuration shown in FIG. 5 differs from the example of the configuration shown in FIG. 2 in that a line-data-shift arithmetic unit 127 is provided. In other respects, the configuration is the same as that shown in FIG. 2. Detailed description for the same points will be omitted.

Referring to FIG. 5, the line-data-shift arithmetic unit 127 shifts line data according to a shift amount β. A shift amount β=−1 is fixedly set in the line-data-shift arithmetic unit 127 of the 45°-direction edge-preservation-type recursive filter 12-1.

The line-data-shift arithmetic unit 127 of the 45°-direction edge-preservation-type recursive filter 12-1 stores in the line memory 128 line data obtained by one-pixel shifting leftward the line data (unsharpened image) output from the adder 126, and exceptionally stores 0 for the rightmost pixel in one line. Thus, the line data output from the 45°-direction edge-preservation-type recursive filter 12-1 is obtained as an output of smoothing in the 45° direction.

A shift amount β=0 is fixedly set in the line-data-shift arithmetic unit 127 of the 90°-direction edge-preservation-type recursive filter 12-2. In this case, the line-data-shift arithmetic unit 127 of the edge-preservation-type recursive filter 12-2 stores the output from the adder 126 in the line memory 128 without shifting. Thus, the line data output from the 90°-direction edge-preservation-type recursive filter 12-2 is obtained as an output of smoothing in the 90° direction. The edge-preservation-type recursive filter 12-2 may be formed without the line-data-shift arithmetic unit 127, as shown in FIG. 2.

A shift amount β=1 is fixedly set in the line-data-shift arithmetic unit 127 of the 135°-direction edge-preservation-type recursive filter 12-3. The line-data-shift arithmetic unit 127 of the 135°-direction edge-preservation-type recursive filter 12-3 stores in the line memory 128 line data obtained by one-pixel shifting rightward the line data (unsharpened image) output from the adder 126, and exceptionally stores 0 for the leftmost pixel in one line. Thus, the line data output from the 135°-direction edge-preservation-type recursive filter 12-3 is obtained as an output of smoothing in the 135° direction.

The output images in the respective directions from the above-described edge-preservation-type recursive filters 12-1, 12-2, and 12-3 for filtering in three directions are output to the averaging unit 13, and average values are computed in the averaging unit 13. The averaging unit 13 may perform weighting averaging by weighting the output values from the edge-preservation-type recursive filters 12-1, 12-2, and 12-3 for filtering in three directions and thereafter performing averaging for obtaining arithmetic means. For example, the output images from the edge-preservation-type recursive filters 12-1, 12-2, and 12-3 for filtering in three directions may be combined by setting the weight for the edge-preservation-type recursive filter 12-2 to 2 and each of the weights for the edge-preservation-type recursive filters 12-1 and 12-3 to 3 and obtaining a combination of the addition of the output values therefrom and bit shift (three-bit shift).

The effects of the image processing device according to the present invention will next be described with reference to FIGS. 6 and 7.

Figure 6:
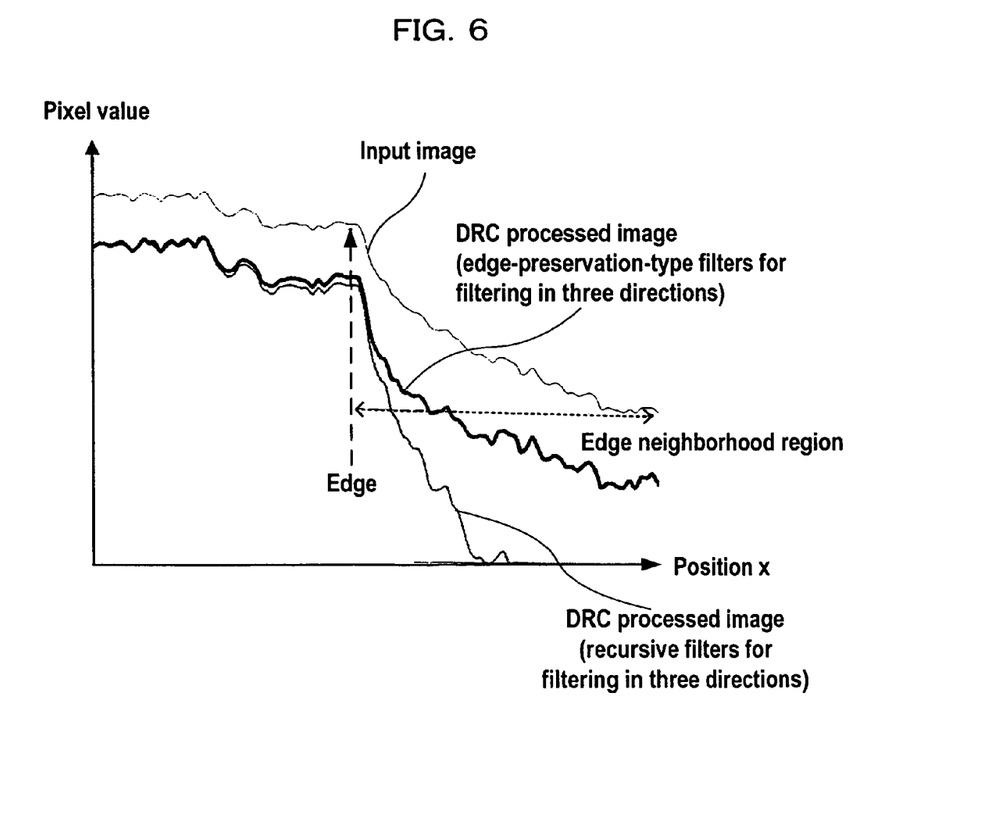
FIG. 6 is a diagram used for explanation of the effect of the present invention (limitation of black region in an edge neighborhood region)

FIG. 6 is a graph showing profiles of an input image, an image DRC processed by using the edge-preservation-type recursive filters for filtering in three directions, and an image DRC processed by using a recursive filters for filtering in three directions (not of the edge preservation type).

In the case of DRC processing using the non-edge-preservation-type recursive filters, low-frequency components are excessively subtracted in an edge neighborhood region with respect to the recursive filter processing directions due to phase distortion on the input image, resulting in occurrence of a black region in the DRC processed image (pixel value P=0). In contrast, DRC processing using the edge-preservation-type recursive filters for filtering in three directions according to the present invention ensures a reduction in black region in an edge neighborhood region.

Figure 7:
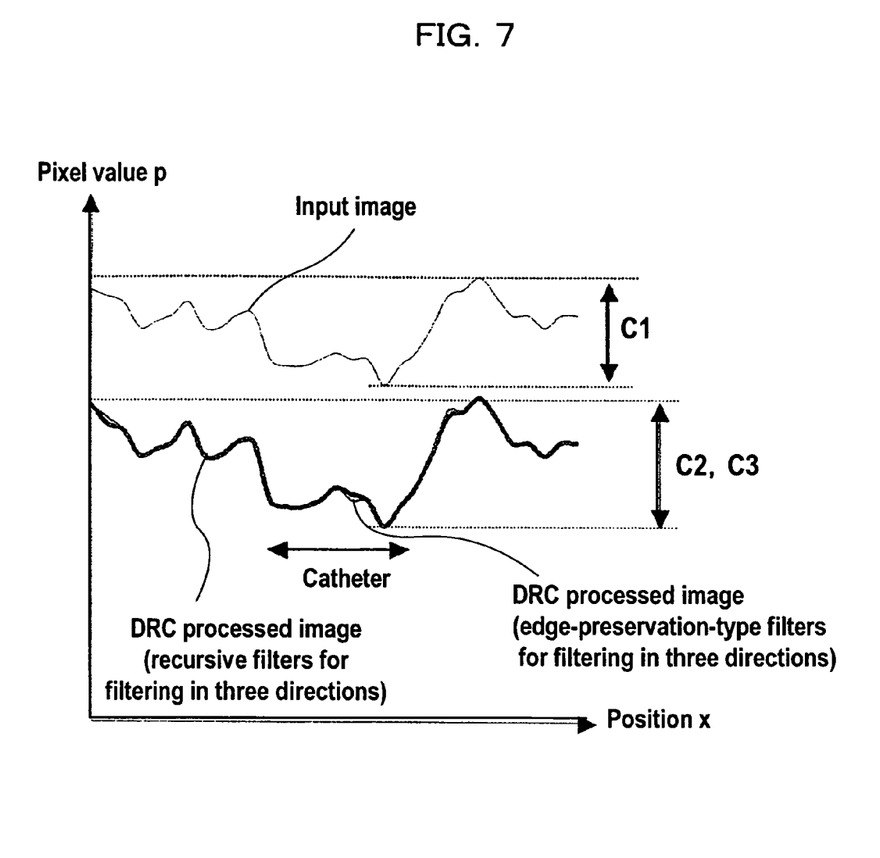
FIG. 7 is a diagram used for explanation of the effect of the present invention (an improvement in contrast at a catheter).

Also, as shown in FIG. 7, contrast C2 of the image DRC processed by using the edge-preservation-type recursive filters for filtering in three directions is substantially the same as contrast C3 of the image DRC processed by using the non-edge-preservation-type recursive filters for filtering in three directions, and contrast C1 of a catheter in the input image can be improved.

That is, contrast at medium-to-fine details of an image such as a catheter and blood vessels as well as a guide wire in the case of the conventional art can be improved by DRC processing using edge-preservation-type recursive filters for filtering in a plurality of directions, while limiting black region.

INDUSTRIAL APPLICABILITY

According to the present invention, as described above, the delay due to image processing is short; the amount of computation is small; an artifact such as black region is not caused in a processed image; contact for a medium-to-fine detail of an image such as a catheter can be largely improved.

The invention claimed is:

1. An image processing device, comprising:
   recursive filtering means for smoothing an input image, the recursive filtering means including:
   edge setting means for setting at least one edge having a predetermined angle from a scanning line direction of the input image; and
   control means for smoothing the input image to be smoothed in correspondence with the edge set by the edge setting means, the control means including means for calculating a difference value between the input image, inputted frame-by-frame, and a second input image at corresponding address one line before,
   means for multiplying the difference value by a coefficient corresponding to the difference value,
   means for shifting the second input image at the corresponding address one line before, in correspondence with the edge set by the edge setting means, and means for adding the difference value, which is multiplied by the corresponding coefficient, to the second input image, which is shifted by the means for shifting, and outputting a result of the addition as an unsharpened image;
   low-frequency component compression means for setting an amount of compression of low-frequency components of the input image according to an output of the recursive filtering means;
   arithmetic means for compressing the low-frequency components of the input image by subtracting the unsharpened image from the input image inputted frame-by-frame and using the amount of compression set by the low-frequency component compression means; and
   means for outputting the resulting image, whose low-frequency components are compressed, to a monitor.

2. The image processing device according to claim 1, further comprising:
   display means of displaying the input image; and
   region of interest setting means of setting a region of interest in the input image displayed in the display means,
   wherein the edge setting means sets an at least one edge on the basis of the region of interest set by the region of interest setting means.

3. The image processing device according to claim 1, further comprising low-frequency component compression means of setting an amount of compression by which low-frequency components of the input image are compressed according to the smoothed input image generated by the recursive filtering means,
   wherein the control means changes an output from the recursive filtering means on the basis of the compression amount set by the low-frequency component compression means.

4. The image processing device according to claim 3, wherein the low-frequency component compression means has lookup table means supplied with an output value from the recursive filtering means and converting the output value into a value obtained by multiplying the output value by a predetermined coefficient.

5. The image processing device according to claim 1, wherein the recursive filtering means performs processing expressed by $$g(t)=k \cdot f(t)+(1-k) \cdot g(t-1)$$

where g(t) is the output from the recursive filtering means, k is a filter coefficient, f(t) is the input image, 1−k is a feedback rate, and g(t−1) is the output from the recursive filtering means one-line before, and the recursive filtering means changes the feedback rate (1−k) on the basis of a magnitude of the difference (d) between the input image (f(t)) and the output value (g(t−1)) of the recursive filtering means one-line before.

6. The image processing device according to claim 1, wherein the recursive filtering means separately generates smoothed images with respect to edges in direction at 45° from the scanning line direction of the input image (left-downward direction), a direction at 90° from the scanning line direction (downward direction) and a direction at 135° from the scanning line direction (right-downward direction).

7. The image processing device according to claim 6, wherein weighting averaging is performed on the smoothed images separately generated with respect to the at least one edge by the recursive filtering means.

8. The image processing device according to claim 1, further comprising delay means for delaying the input image with respect to time processing's performed by the image processing device including the recursive filtering means,
wherein the input image delayed by the delay means is input as the unsharpened image to the arithmetic means.

9. The image processing device according to claim 1, wherein the recursive filtering means comprises:
a first line memory in which one line of first line data of the input image is stored;
a second line memory in which line data, before storage in the first line memory, is stored;
an arithmetic device which subtracts the first line data stored in the first line memory from the line data stored in the second line memory;
lookup table means of converting the difference value obtained by subtraction performed by the arithmetic device into a value obtained by multiplying the difference value by a filter coefficient;
and an adder which adds together the value converted by the lookup table means as a result of multiplication by the filter coefficient and the line data stored in the second line memory.

* * * * *